United States Patent
Bruce et al.

(10) Patent No.: US 8,615,644 B2
(45) Date of Patent: Dec. 24, 2013

(54) PROCESSOR WITH HARDWARE THREAD CONTROL LOGIC INDICATING DISABLE STATUS WHEN INSTRUCTIONS ACCESSING SHARED RESOURCES ARE COMPLETED FOR SAFE SHARED RESOURCE CONDITION

(75) Inventors: Becky Bruce, Leander, TX (US); Giles R. Frazier, Austin, TX (US); Bradly G. Frey, Austin, TX (US); Kumar K. Gala, Austin, TX (US); Cathy May, Ossining, NY (US); Michael D. Snyder, Cedar Park, TX (US); Gary Whisenhunt, Leander, TX (US); James Xenidis, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 12/708,791

(22) Filed: Feb. 19, 2010

(65) Prior Publication Data

US 2011/0208949 A1    Aug. 25, 2011

(51) Int. Cl.
*G06F 9/38* (2006.01)
(52) U.S. Cl.
USPC .......................... 712/214; 712/205; 712/216
(58) Field of Classification Search
None
See application file for complete search history.

(56) References Cited

U.S. PATENT DOCUMENTS

| | | | |
|---|---|---|---|
| 6,976,155 B2 | 12/2005 | Drysdale et al. | |
| 7,093,106 B2 | 8/2006 | Ambekar et al. | |
| 7,155,600 B2 | 12/2006 | Burky et al. | |
| 7,216,223 B2 | 5/2007 | Michaelis | |
| 7,487,505 B2 | 2/2009 | Rosenbluth et al. | |
| 7,757,070 B1 * | 7/2010 | Kang et al. | 712/228 |
| 2006/0004988 A1 | 1/2006 | Jordan | |
| 2007/0094669 A1 * | 4/2007 | Rector et al. | 718/104 |
| 2008/0301700 A1 | 12/2008 | Junkins et al. | |
| 2009/0013329 A1 | 1/2009 | May et al. | |
| 2009/0100249 A1 | 4/2009 | Eichenberger et al. | |
| 2009/0144737 A1 | 6/2009 | Armstrong et al. | |
| 2009/0182989 A1 | 7/2009 | Rosenbluth et al. | |

OTHER PUBLICATIONS

"Power ISA Book III", Jan. 30, 2009, pp. 899-902, ver 2.06, US.
Park, II; "Implicitly-Multithreaded Processors", Doctor of Philosophy Thesis, Purdue University, Aug. 2003.
Andrew, et al.; "hthreads: A Hardware/Software Co-Designed Multithreaded RTOS Kernel", IEEE Conference on, vol. 2, Sep. 19-22, 2005, pp. 330-338.
Yen-Kuang, et al.; "The Impact of SMT/SMP Designs on Multimedia Software Engineering-A Workload Analysis Study", IEEE Proceedings, Dec. 11-13, 2002.
Alastruey, et al.; "Selection of the Register File Size and the Resource Allocation Policy on SMT Processors", IEEE Inter. Oct. 29-Nov. 1, 2008, pp. 63-70.

* cited by examiner

*Primary Examiner* — Kenneth Kim
(74) *Attorney, Agent, or Firm* — Mitch Harris, Atty at Law, LLC; Andrew M. Harris; Matthew W. Baca

(57) ABSTRACT

A technique for indicating a safe shared resource condition with respect to a disabled thread provides a mechanism for providing a fast indication to other hardware threads that a temporarily disabled thread can no longer impact shared resources, such as shared special-purpose registers and translation look-aside buffers within the processor core. Signals from pipelines within the core indicates whether any of the instructions pending in the pipeline impact the shared resources and if not, then the thread disable status is presented to the other threads via a state change in a thread status register. Upon receiving an indication that a particular hardware thread is to be disabled, control logic halts the dispatch of instructions for the particular hardware thread, and then waits until any indication that a shared resource is impacted by an instruction has cleared. Then the control logic updates the thread status to indicate the thread is disabled.

13 Claims, 4 Drawing Sheets

PROCESSOR WITH HARDWARE THREAD CONTROL LOGIC INDICATING DISABLE STATUS WHEN INSTRUCTIONS ACCESSING SHARED RESOURCES ARE COMPLETED FOR SAFE SHARED RESOURCE CONDITION

BACKGROUND OF THE INVENTION

1. Field of the Invention

The present invention is related to processing systems and processors, and more specifically to techniques for disabling a hardware thread and indicating when shared resources for the thread will not impacted by the disabled thread while instructions are still pending for the disabled thread.

2. Description of Related Art

In simultaneous multi-threaded (SMT) processors, some hardware resources are shared by multiple hardware threads, and therefore the hardware threads can be impacted by other threads' actions on the shared resources. Hardware threads are separate streams of execution performed in pipelines of a process, in contrast to software threads, which may be executed in a single hardware thread or by multiple hardware threads and represent paths of execution of one or more programs.

Operating systems provide tools such as spinlocks and critical sections for preventing software threads from modifying shared resources, effectively disabling other software threads while the resource is being modified or read. Such tools are easily implemented in multiple software threads executing in a single hardware thread, as the execution paths can be immediately managed. However, there is not a similar technique for hardware threads. Hardware threads are generally independent. Therefore, in order to prevent a thread from impacting a shared resource in present hardware, the thread is typically completely disabled and flushed from the pipeline, along with a release of resources, including instruction queues and mapped registers.

Therefore, in present day systems, in order to ensure that resources shared by a thread that could otherwise be only temporarily halted, the thread must be completely disabled, the pipelines flushed and resources released. The time required to perform such operations is substantial and may have further impact on system performance, since any task that was assigned to the hardware thread being disabled must be re-assigned to another hardware thread.

It would therefore be desirable to provide an indication to other threads that a particular hardware thread has been disabled and shared resources are safe from actions of the particular thread. It would further be desirable to provide such an indication without completely flushing the particular hardware thread from a processor, by only temporarily disabling the particular hardware thread.

BRIEF SUMMARY OF THE INVENTION

The invention is embodied in a processor core and computer system that provide an indication when a disabled thread no longer has pending instructions that impact shared resources within the processor core.

Upon receiving an indication that a particular hardware thread should be disabled, control logic in the processor indicates to the dispatch unit to halt instruction dispatch for the particular hardware thread. Then the control logic waits to update a thread status indication for the particular hardware thread until instructions that impact the shared resources have all cleared the pipeline(s) within the processor core. The shared resources may include special purpose registers within the processor core, as well as other shared resources such as translation look-aside buffers.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to processors and processing systems in which a status indicating whether a thread is enabled or disabled reflects whether the thread no longer has pending instructions that can modify a resource shared with other threads.

Figure 1:
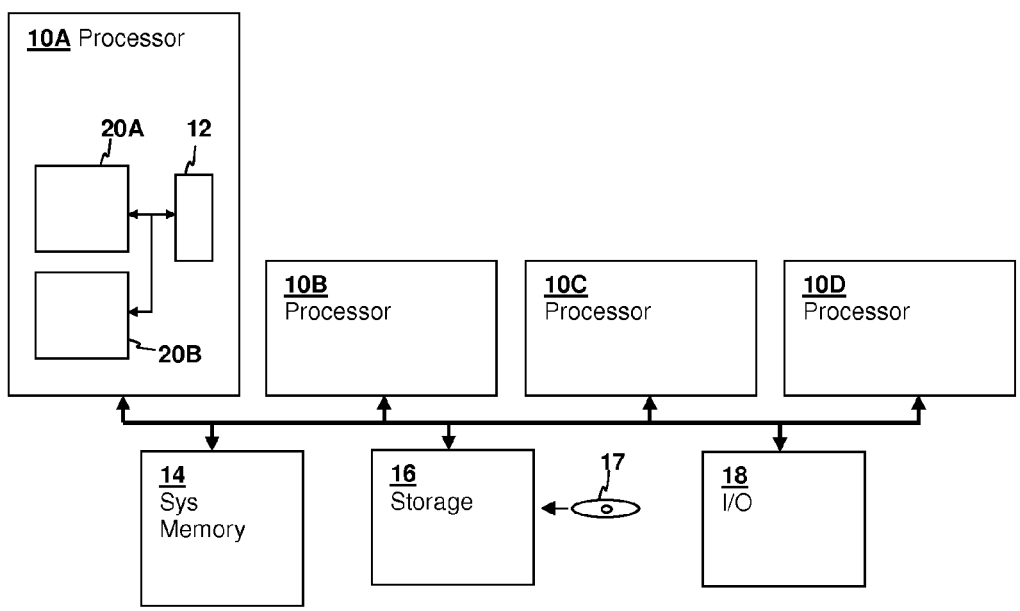
FIG. 1 is a block diagram illustrating a processing system in which techniques according to an embodiment of the present invention are practiced.

Referring now to FIG. 1, a processing system in accordance with an embodiment of the present invention is shown. The depicted processing system includes a number of processors 10A-10D, each in conformity with an embodiment of the present invention. The depicted multi-processing system is illustrative, and processing system in accordance with other embodiments of the present invention include uni-processor systems having symmetric multi-threading (SMT) cores. Processors 10A-10D are identical in structure and include cores 20A-20B and local storage 12, which may be a cache level, or a level of internal system memory. Processors 10A-10B are coupled to main system memory 14, a storage subsystem 16, which includes non-removable drives and optical drives, for reading media such as a CD-ROM 17 containing program instructions implementing a hypervisor for controlling multiple logical partitions (LPAR) for execution by processors 10A-10D and also containing executable programs that implement applications and services executing within the logical partitions. The illustrated processing system also includes input/output (I/O) interfaces and devices 18 such as mice and keyboards for receiving user input and graphical displays for displaying information. While the system of FIG. 1 is used to provide an illustration of a system in which the processor architecture of the present invention is implemented, it is understood that the depicted architecture is not limiting and is intended to provide an example of a suitable computer system in which the techniques of the present invention are applied.

Figure 2:
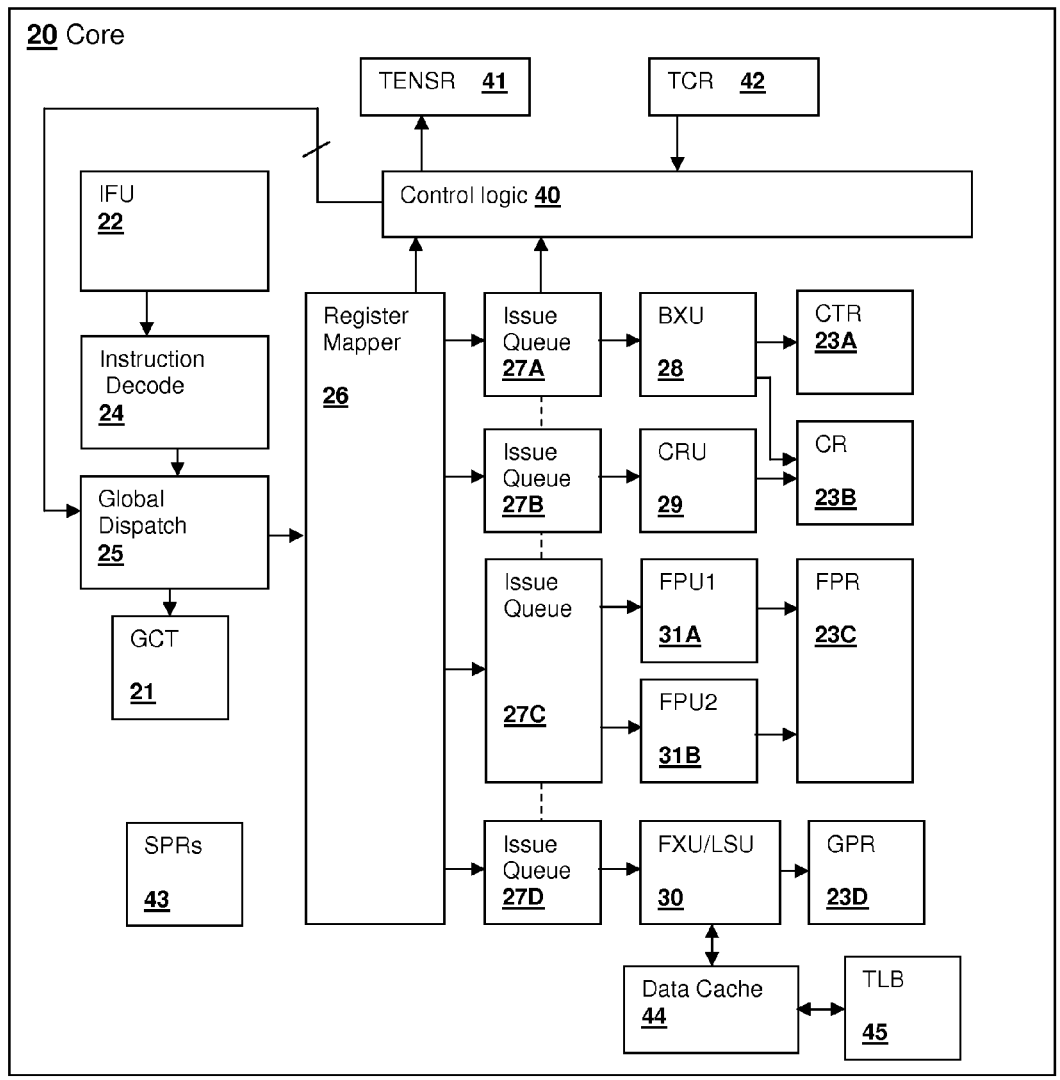
FIG. 2 is a block diagram illustrating details of a processor core in accordance with an embodiment of the present invention.

Referring now to FIG. 2, details of processor cores 20A-20B of FIG. 1 are illustrated in depicted core 20. Core 20 includes an instruction fetch unit (IFU) 22 that fetches one or more instruction streams from cache or system memory and presents the instruction stream(s) to an instruction decode unit 24. A global dispatch unit 25 dispatches the decoded instructions to a number of internal processor pipelines. The processor pipelines each include a register mapper 26, one of issue queues 27A-27D, and an execution unit provided by branch execution unit (BXU) 28, condition result unit (CRU) 29, fixed-point unit load-store unit (FXU/LSU) 30 or floating point units (FPUs) 31A-31B. Registers such as counter register (CTR) 23A, condition register (CR) 23B general-purpose registers (GPR) 23D, and floating-point result registers (FPR) 23C provide locations for results of operations performed by the corresponding execution unit(s). Special purpose registers (SPRs) 43 provide support for hypervisor status and control, including shared registers as will be described herein that are indicated as safe from further modification by a disabled thread according to techniques of the present invention. A global completion table (GCT) 21 provides an indication of pending operations that is marked as completed when the results of an instruction are transferred to the corresponding one of result registers 23A-23D. Register mappers 26 allocate storage in the various register sets so that concurrent execution of program code can be supported by the various pipelines.

FXU/LSU 30 is coupled to a data cache 44 that provides for loading and storing of data values in memory that are needed or modified by the pipelines in core 20. Data cache 44 is coupled to one or more translation look-aside buffers (TLB) 45 that map real or virtual addresses in data cache 44 to addresses in an external memory space. TLB 45 is an example of a resource that is shared by multiple hardware threads, as are some of special purpose registers SPRs 43. Examples of SPRs 43 that may be shared are registers that identify the LPAR in which the threads are executing, and that control the LPARs characteristics and mappings to real memory addresses, etc. Since any modification of such SPRs 43 by a thread would change the state of the LPAR, certain hypervisor operations need to ensure that those resources are not modified by other threads during some operations. The present invention provides that a thread may be disabled temporarily while critical operations or other maintenance is performed by the hypervisor managing the multiple logical partitions executing within the computer system of FIG. 1, so that a thread does not have to be completely cleared from core 20 in order to perform such operations. By providing for a fast disable/enable process for managing hardware threads within core 20, processing overhead introduced by the hypervisor can be reduced, since thread instructions that do not impact shared resources can be allowed to complete after the thread disable indication has been provided to other threads, and there is no need to clear pre-fetch queues or release resources that remain committed to the hardware thread and therefore will be available when the thread resumes an enabled state.

In the illustrated core 20, a thread enable status register (TENSR) 41 is provided that indicates the status of a thread. In particular, in accordance with an embodiment of the present invention, the status of a thread is not set to disabled within TENSR 41 until instructions for the disabled thread that may modify shared resources have cleared the pipeline A thread control register (TCR) 42 is provided for the hypervisor to control the enabled/disabled state of the individual hardware threads. TENSR 41 is a read-only register in the illustrative embodiment, but TENSR 41 can be provided by TCR 42 in accordance with some embodiments of the invention and as such TCR 42 cannot be read-only. In such embodiments, a read-back of TCR 42 in which a value of TCR 42 set by the hypervisor is not reflected in the read-back value until control logic 40 determines that the shared resources included in the set of shared resources guaranteed safe by the threads indicated as disabled in TENSR 41 are not impacted by instructions remaining in the pipelines for a newly-disabled thread. Control logic 40 also signals global dispatch 25 to stop dispatching instructions for the thread that has been disabled, so that no more instructions implicating the set of shared resources can be sent to issue queues 27A-27C.

Figure 3:
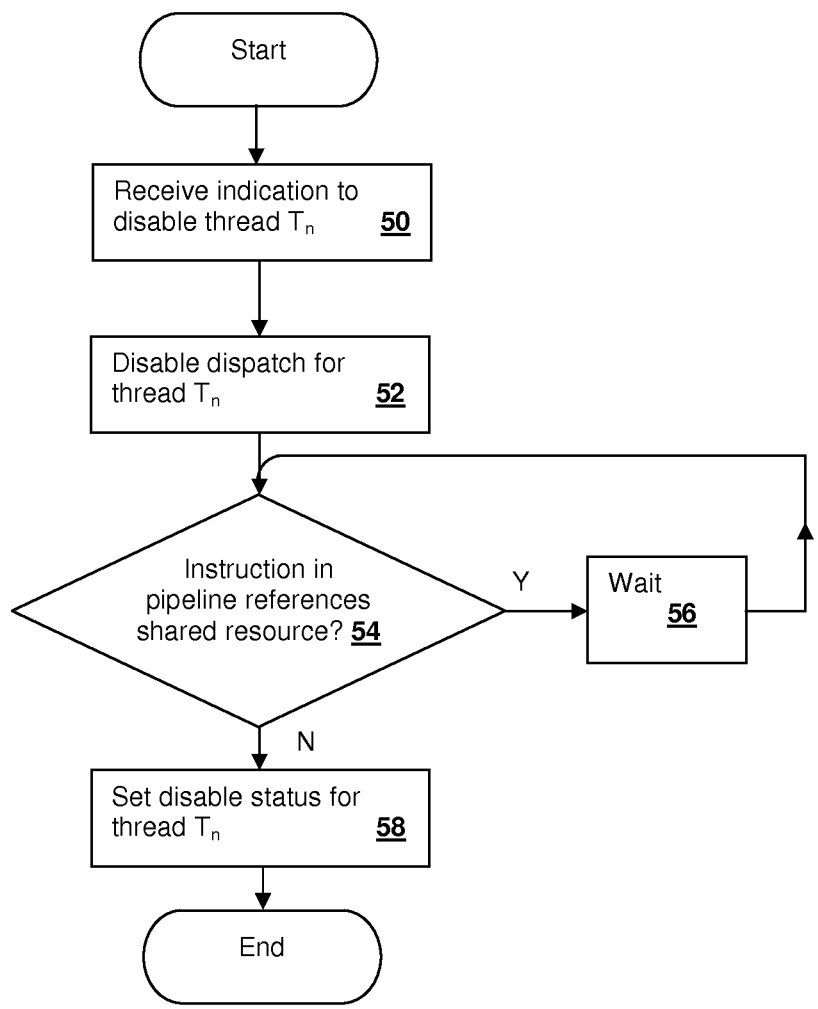
FIG. 3 is a flowchart depicting a method of indicating thread enable/disable status in a processor in accordance with an embodiment of the present invention.

Referring now to FIG. 3, a method of operation of circuits within processor core 20 is shown in a flowchart. An indication is received to disabled hardware thread $T_n$, which in processor core 20 is the setting of a bit corresponding to the particular hardware thread in TCR 42. In response, global dispatch 25 disables dispatch of instructions for thread $T_n$. While instructions remain in the pipelines that reference one of the shared resources (decision 54), a wait state is entered 56 with respect to the setting of TENSR 41 (step 56). Once the instructions that reference one of the shared resource have cleared the pipelines (decision 54), an indication of a disabled status is set for thread $T_n$, which in processor core 20 is the setting of a bit corresponding to the particular hardware thread in TENSR 41. While the illustrative embodiment indicates and controls thread enable status via the setting and reading of a bit in one or more registers, it is understood that other techniques for signaling thread enable/disable status such as sending of a one time message can be provided and are contemplated for use in the techniques disclosed and claimed herein. Further, there are other techniques for enabling and disabling threads, such as specific commands, and the use of other techniques for enabling and disabling threads is also contemplated by the present invention.

Figure 4:
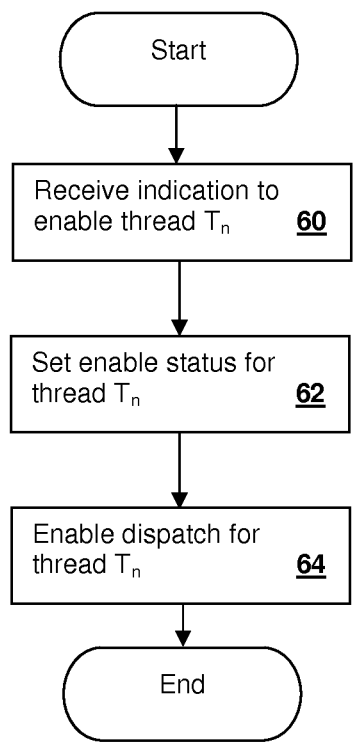
FIG. 4 is a flowchart depicting a method of setting thread enable/disable status in a processor in accordance with an embodiment of the present invention.

Referring now to FIG. 4, a method of enabling a thread that may be used in processor cores in accordance of the present invention, is illustrated in a flowchart. An indication to enable thread $T_n$ is received (step 60), and the thread enabled state is set for the corresponding bit in TENSR 41 (step 62), so that other threads are warned that the particular hardware thread may begin executing instructions that impact shared resources. After the status is updated in TENSR 41, dispatch of instructions for thread $T_n$ is re-enabled (step 64).

Depending on processor core implementation, the shared resources guaranteed safe by the techniques of the present invention may vary. In general, software executed by prior art processors, in particular the hypervisor had to ensure that the reading of a state of a shared resource and the control of the shared resource were managed in a manner that did not cause an error or an invalid state due to modification of the shared resource by another hardware thread. With the present invention, the set of shared resources guaranteed safe can be disregarded with respect to the above-described undesirable modification. However, the set of shared resources in a given processor core implementation may include for example, only SPRs 43 and not TLB 45, in which case TLB 45 must be managed properly so as to not generate an invalid mapping. Further, in all of the discussion above, the shared resources guaranteed safe extended to resources within core 20 itself and were not specified as including such items as data within cache 44, but with additional logic it is possible to determine whether, for example, a shared external resource such as an entry in data cache 44 is still referenced by an instruction still in the pipeline for a disabled thread. The same, with external extensions, is possible for resources external to core 20. In other embodiments of the invention, control logic 40 may wait to indicate a safe status until all instructions in the pipelines for the disabled thread(s) have cleared, while not requiring the resources and queues associated with the thread to be released.

Finally, while the method depicted in FIG. 3 indicates that the particular hardware thread has been disabled once there are no instructions in the pipeline that reference a shared resource. The above can be accomplished in the illustrated embodiment by a bit in each register-specifier tag and an indication of whether each instruction required a lookup in TLB 45 with each indication combined in a logical-OR operation to signal whether an instruction exists in the pipeline that references the shared resources. However, depending on the desired complexity of the logic, unsafe operations can be further qualified as only those that modify a shared resource, or for example, change the state of TLB 45 and therefore, in accordance with other embodiments of the present invention, "references" in decision 54 of FIG. 3 may be replaced with "modifies."

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A processor core supporting execution of multiple hardware threads, comprising:
   one or more instruction pipelines including execution units for executing instructions of the multiple hardware threads;
   an instruction fetch unit for fetching the instructions;
   an instruction dispatch unit for dispatching the instructions to the one or more instruction pipelines;
   a set of resources shared by the multiple hardware threads; and
   a control logic that receives an indication to disable a particular one of the multiple hardware threads, wherein the control logic signals the instruction dispatch unit to halt dispatch of instructions for the particular hardware thread, determines whether or not dispatched instructions in one or more instruction pipelines for the particular hardware thread that impact the set of shared resources have been completed, and responsive to determining that the dispatched instructions that impact the set of shared resources have completed, indicating to at least one other hardware thread that the particular hardware thread is disabled, wherein the control logic only indicates to the at least one other hardware thread that the particular hardware thread is disabled after determining that the dispatched instructions that impact the set of shared resources have completed.

2. The processor core of claim 1, wherein the control logic determines that the dispatched instructions for the particular hardware thread that impact the set of shared resources have been completed, while other dispatched instructions for the particular hardware thread are still being processed by the execution units in the one or more pipelines.

3. The processor core of claim 1, further comprising a thread control register having a thread disable bit having a state directing that the particular hardware thread be disabled, and wherein the control logic receives a signal from the thread disable bit in the thread control register.

4. The processor core of claim 1, wherein the control logic indicates that the particular hardware thread is disabled by setting a bit in a thread status register.

5. The processor core of claim 1, wherein the set of shared resources includes the subset of special purpose registers within the processor core that are shared among the multiple hardware threads.

6. The processor core of claim 5, wherein the set of shared resources is only the subset of special purpose registers within the processor core that are shared among the multiple hardware threads.

7. The processor core of claim 1, wherein the set of shared resources includes a set of translation look-aside buffers within the processor core that are shared among the multiple hardware threads.

8. A processing system, comprising:
   a memory for storing program instructions and data values; and
   a processor coupled to the memory for executing the program instructions to operate on the data values, wherein the processor comprises one or more instruction pipelines including execution units for executing instructions of the multiple hardware threads, an instruction fetch unit for fetching the instructions, an instruction dispatch unit for dispatching the instructions to the one or more instruction pipelines, a set of resources shared by the multiple hardware threads; and a control logic that receives an indication to disable a particular one of the multiple hardware threads, wherein the control logic signals the instruction dispatch unit to halt dispatch of instructions for the particular hardware thread, determines whether or not dispatched instructions in one or more instruction pipelines for the particular hardware thread that impact the set of shared resources have been completed, and responsive to determining that the dispatched instructions that impact the set of shared resources have completed, indicating to at least one other hardware thread that the particular hardware thread is disabled, wherein the control logic only indicates to the at least one other hardware thread that the particular hardware thread is disabled after determining that the dispatched instructions that impact the set of shared resources have completed.

9. The processing system of claim 8, wherein the control logic determines that the dispatched instructions for the particular hardware thread that impact the set of shared resources have been completed, while other dispatched instructions for the particular hardware thread are still being processed by the execution units in the one or more pipelines.

10. The processing system of claim 8, wherein the control logic indicates that the particular hardware thread is disabled by setting a bit in a thread status register within the processor.

11. The processing system of claim 8, wherein the set of shared resources includes the subset of special purpose registers within the processor that are shared among the multiple hardware threads.

12. The processing system of claim 10, wherein the set of shared resources is only the subset of special purpose registers within the processor that are shared among the multiple hardware threads.

13. The processing system of claim 8, wherein the set of shared resources includes a set of translation look-aside buffers within the processor that are shared among the multiple hardware threads.

* * * * *